US009641379B2

(12) United States Patent
Noldus

(10) Patent No.: US 9,641,379 B2
(45) Date of Patent: *May 2, 2017

(54) CACHING OF ANNOUNCEMENTS AT THE EDGE OF A PACKET SWITCHED TELECOMMUNICATION NETWORK

(71) Applicant: Telefonaktiebolaget LM Ericsson (publ), Stockholm (SE)

(72) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,407

(22) Filed: Mar. 18, 2016

(65) Prior Publication Data

US 2016/0205212 A1    Jul. 14, 2016

Related U.S. Application Data

(63) Continuation of application No. 13/977,980, filed as application No. PCT/EP2011/050223 on Jan. 10, 2011, now Pat. No. 9,319,263.

(51) Int. Cl.
H04L 29/06     (2006.01)
H04L 29/08     (2006.01)

(52) U.S. Cl.
CPC .... H04L 29/06176 (2013.01); H04L 65/1016 (2013.01); H04L 65/1063 (2013.01);
(Continued)

(58) Field of Classification Search
None
See application file for complete search history.

(56) References Cited

U.S. PATENT DOCUMENTS 6,678,659 B1    1/2004  Van Kommer
2001/0037335 A1*  11/2001  Tooyama .......... G06F 17/30867
(Continued)

FOREIGN PATENT DOCUMENTS

CN    101159971 A    4/2008
CN    101534314 A    9/2009

OTHER PUBLICATIONS

Schulzrinne, H., et al., "RTP: A Transport Protocol for Real-Time Applications," Network Working Group, Request for Comments 3550, Jul. 2003.
(Continued)

Primary Examiner — Chirag Shah
Assistant Examiner — Rina Pancholi
(74) Attorney, Agent, or Firm — Baker Botts, LLP

(57) ABSTRACT

A method and an access server operating in a packet switched telecommunication network, such as a Voice over Internet Protocol (VoIP) network, for distributing an announcement to user equipment. The method comprises receiving an announcement from a media source, receiving a caching indication from the media source to allow caching of the announcement and sending the received announcement to the user equipment. The access server can cache the announcement in a caching unit associated with the access server on receipt of the caching indication and the announcement. Furthermore a method and a media source cooperating with the access server for generating an announcement and a caching indication to allow the access server to cache the announcement.

21 Claims, 4 Drawing Sheets

(52) U.S. Cl.
CPC ...... *H04L 65/1096* (2013.01); *H04L 65/4084* (2013.01); *H04L 67/2842* (2013.01)

(56) References Cited

U.S. PATENT DOCUMENTS

| | | | |
|---|---|---|---|
| 2004/0179658 A1* | 9/2004 | Lowmaster | H04M 3/487 379/88.17 |
| 2004/0267824 A1 | 12/2004 | Pizzo et al. | |
| 2007/0124309 A1* | 5/2007 | Takase | G06F 17/30902 |
| 2007/0206609 A1* | 9/2007 | Peisa | H04L 29/06027 370/400 |
| 2010/0008290 A1* | 1/2010 | Fischer | H04L 67/2842 370/328 |
| 2010/0131617 A1* | 5/2010 | Osborne | H04L 69/04 709/219 |

OTHER PUBLICATIONS

Baugher, M., et al., "The Secure Real-Time Transport Protocol (SRTP)," Network Working Group, Request for Comments 3711, Mar. 2004.

Handley, M., et al., "SDP: Session Description Protocol," Network Working Group, Request for Comments 4556, Jul. 2006.

Huawei, "Procedure of Playing Tone and Announcement", 3GPP Draft; C4-060895, 3rd Generation Partnership Project (3GPP), Mobile Competence Centre; 650, Route des Lucioles; F-06921 Sophia-Antipolis Cedex; France, vol. CT WG4, No. Singapore, Jul. 7, 2006.

3GPP TS 23.228, "3rd Generation Partnership Project; Technical Specification Group Services and System Aspects; IP Multimedia Subsystem (IMS); Stage 2 (Release 10)" V10.2.0, Sep. 2010.

3GPP TS 23.002, "3rd Generation Partnership Project; Technical Specification Group Services and System Aspects; Network Architecture (Release 10)" V10.0.0, Sep. 2010.

International Search Report for PCT/EP2011/050223, Oct. 13, 2011.

Written Opinion of the International Searching Authority, Oct. 13, 2011.

First Office Action issued by the State Intellectual Property Office of People's Republic of China for Application No. 201180064665.3 (English translation included), Jul. 2, 2015.

* cited by examiner

CACHING OF ANNOUNCEMENTS AT THE EDGE OF A PACKET SWITCHED TELECOMMUNICATION NETWORK

RELATED APPLICATIONS

This application is a continuation, under U.S.C. §120, of U.S. application Ser. No. 13/977,980, filed Aug. 12,2013, which is a U.S. National Stage Filing under 35 U.S.C. §371 of International Patent Application Ser. No. PCT/EP2011/050223, filed Jan. 10, 2011, and published on Jul. 19,2012 as WO 2012/095165 A1 both of which are incorporated herein by reference.

TECHNICAL FIELD

The invention relates to a method and access server for sending an announcement in a packet switched telecommunication network, a method and media source for generating an announcement in a packet switched telecommunication network.

BACKGROUND

Generally, when a call is established in a packet switched telecommunication network such as an IMS network or a Voice over Internet Protocol (VoIP) network or when the call is established from another network such as Circuit Switched network, for example a wireline or mobile telecommunication network, the calling party is connected to the network via a border gateway. When the calling party is subscriber of the packet switched network, then this border gateway constitutes the User to Network Interface (UNI) such as a Proxy Call Session Control Function (P-CSCF) and an access gateway in an IMS network. When the calling party belongs to another (IMS) network, then this border gateway forms a Network to Network Interface (NNI) such as a Media Gateway Control Function (MGCF) plus an IMS Media Gateway (IMS-MGW).

When the call establishment or call release requires an announcement to be generated by a media source and the announcement to be streamed towards the calling party, media will be transferred from a media entity in the user plane (i.e. the plane carrying the media) towards the user equipment of the calling party. For example:

- an announcement can be streamed by the media source, for example a Multi Media Resource Function Processor (MRFP), where the MRFP acts under control of a Multimedia Resource Function Controller (MRFC). Media packets can be sent from the MRFP to an IMS access gateway, to an IM-MGW or to a Transition Gateway (TrGW), depending on the calling party, or
- a standard voice mail welcome message can be streamed by the voice mail system. Media packets are sent from the Voicemail system to the IMS Access Gateway, the IM-MGW or TrGW, or
- contents such as a personalised greeting can be streamed as an announcement from a content system towards the user equipment of the calling party.

The prerecorded announcements are kept in central storage system(s) in the packet switched telecommunication network and can be distributed to the end-user when required. An example of such an announcement can be an announcement provided to a calling subscriber during call establishment, to inform the calling subscriber that the called party is not reachable.

Each time a call requires an announcement to be streamed to the served party, typically the calling party, it is required that the prerecorded announcement is streamed from the media source specially adapted for generating announcements, within the network to the network border and from the network border to the served party user equipment.

Considering large amounts of calling parties requiring an announcement, vast amounts of prerecorded announcements must be streamed through the packet switched telecommunication network towards these calling parties. At the same time many of such calling parties can require the same announcement. Hence the same media stream is transferred to various media network nodes on the network border with high repetition rate. This frequent streaming of the same data constituting an announcement unnecessarily consumes network capacity and is to be avoided.

SUMMARY

It is therefore an object to obviate at least some of the disadvantages described above and to provide improved generation and distribution of announcements in a packet switched telecommunication network.

An advantageous method of sending an announcement to user equipment, by an access server, the access server operating in a packet switched telecommunication network. The method comprises receiving the announcement from a media source operating in said packet switched network, receiving a caching indication associated with said announcement from said media source, indicating an instruction for the access server to initialize caching of said announcement and caching the announcement in a caching unit associated with the access server in response to the received caching indication.

The caching indication triggers the access server to allow the caching of the announcement when received. The caching of the announcement can take place while the announcement is being sent to the user equipment. If the announcement is cached, it is available for re-transmission to the same or another user equipment, communicatively connected to the access server, at a later time. The caching indication to allow the caching of the announcement is sent from a media source in another part of the network, not in the direct vicinity of the network border. By caching the announcement, the announcement or the announcement media stream associated with the announcement is no longer required to travel through the network from the media source to the access server anymore, requiring network resources and taking transmission time, when the access server is requested to re-send the announcement to the user equipment.

The method further comprises receiving an instruction from the media source to send said cached announcement towards the user equipment, retrieving the cached announcement from the caching unit and sending the retrieved cached announcement towards the user equipment.

This enables the media source to send an instruction to the access server for sending the cached announcement to a user equipment. To that effect the access server retrieves the cached announcement from the caching unit according to the instruction and sends the retrieved announcement to the user equipment. The indication that the announcement is cached may be in the form of a list of cached announcements being provided to a media source. The media source can request the access server to send the indication of the at least one announcement being available in the caching unit. The access server can also provide the indication of the at least one announcement being available in the caching unit upon successful caching of an announcement or send the indication of the at least one announcement being available in the caching unit to the application server responsible for initiating the announcement.

By sending the retrieved announcement to the user equipment on the instruction from the media source to send the cached announcement, the saving of network resources is actually achieved. The caching unit preferably is part of or is located near the access server, preferably linked to the access server with a fast connection.

In an embodiment the caching indication has previously been embedded into an announcement media stream by the media source from where the announcement originates. The method further comprises extracting the caching indication from the announcement media stream. This has the advantage that the access server in charge of processing the announcement receives the announcement and the caching indication in a single message, the announcement media stream.

In a further embodiment the method comprises extracting an announcement identifier from the caching indication. Alternatively the announcement identifier can be extracted by the access server from the announcement media stream. The caching of the announcement is then performed using the announcement identifier to identify the cached announcement. The announcement identifier was included in the caching indication by the media source responsible for sending the announcement. This allows a convention for announcement identification in the packet switched telecommunication network for standardised announcements to be used. This also allows re-use of the same announcement originating from various media sources. The announcement identifier can also comprise a part indicating the media source from where the announcement originates. This allows caching announcements specifically associated with a media source.

In an embodiment, the method further comprises sending an indication to the media source of the announcement being in the caching unit. Thus the media source can be made aware of the announcement being in cache.

The step of sending an indication to the media source of the announcement being in the caching unit comprises: receiving a request from an application server to reserve resources for media transfer to and from the user equipment, and sending the indication of the announcement being available in the caching unit to said application server on receipt of said request. The application server can subsequently provide the indication of the at least one announcement being available in the caching unit to the media source.

This way the access server informs the media source that it has announcements in cache, allowing the media source when instructed to generate such an announcement to refrain from sending the announcement to the access server again, but instead instruct the access server to send the announcement from cache. This saves transmission time and network resources.

In an embodiment said indication is included in a list of announcements being available in cache, which can be communicated to the media source, allowing the media source to be aware of all available announcements.

In a further embodiment an announcement identifier is extracted by the access server from the instruction to send an announcement and the corresponding announcement is retrieved from the caching unit using the announcement identifier. This facilitates easy retrieval of the announcement from the caching unit by the access server.

The method proposed enables generating an announcement by a media source, the media source operating in a packet switched telecommunication network such as a VoIP or IMS network. The method comprises receiving a first instruction to generate an announcement, sending the announcement to an access server operating in said packet switched network, generating and sending a caching indication associated with said announcement to the access server for allowing the access server to cache the announcement in a caching unit associated with the access server.

Thus the media source and access server cooperate in the sense that the media source provides the announcement to be distributed by the access server and the indication allowing the access server to cache the announcement, which announcement can be cached by the access server for future use.

The method further comprises the media source receiving an indication of the announcement being available in the caching unit, receiving a second instruction to generate said announcement, and the media source can sending an instruction to an access server to send the cached announcement to the user equipment of the calling subscriber. This also prevents that the announcement has to travel through the network from the media source to the access server before distributing the announcement to the user equipment, instead the announcement can be sent by the access server directly from the caching unit.

In an embodiment said indication is included in a list of announcements being available in cache, the indication is extracted from the list.

In an embodiment the step of sending the announcement to an access server comprises sending the announcement in an announcement media stream, and the step of sending the caching indication comprises embedding the caching indication in the announcement media stream.

This provides the advantage that the announcement and indication are sent and received as a single entity.

In yet a further embodiment the media source obtains an identifier of the corresponding cached announcement from the indication that the announcement is available in the caching unit. The media source includes the identifier of the announcement to be sent by the access server into the instruction. The identifier can for example be supplied by the access server in the form of a list of identifiers indicating announcements available in the caching unit. The media source then uses the identifier to instruct the access server to send the announcement identified by the identifier from the caching unit to the user equipment.

The method proposed enables an application server controlling an access server in distributing an announcement, the application server and access server in use operating in a packet switched telecommunication network such as a VoIP or IMS network. The method comprises receiving a call setup request from a user equipment, determining an announcement relating to the call setup request, receiving an indication of announcements being available in the caching unit from the access server, and forwarding said indication and an instruction to generate said announcement to a media source. This allows the media source to determine when the announcement is not in cache, that it has to stream the announcement to the associated access server with a caching indication, or when the announcement is in cache, that it can provide an instruction to the access server to stream the announcement from cache.

In a further embodiment the method comprises the step of the application server upon receipt of the call setup request sending a request to the access server requesting to reserve resources for media transfer to and from the user equipment from where the call setup originated. In response the access server provides an indication of at least one announcement being available in the caching unit, i.e. a list of cached announcements. This allows the application server to acquire knowledge of cached announcements to be forwarded to the media source.

The method proposed enables a media source controller controlling a media source in providing an announcement, the media source controller and media source both in use operating in a packet switched telecommunication network, such as a VoIP or IMS network, wherein an announcement comprises an announcement media stream. The method comprises a step of receiving a request for generating and sending an announcement to an access server, the request comprising an indication of at least one announcement being available in the caching unit from the access server, and a step of forwarding the request as an instruction, the instruction comprising said indication of at least one announcement being available in cache to the media source. This allows the media source to be aware of announcements in cache in the case the media source is instructed to provide an announcement to the access server in response to an event such as a call setup request. The indication can be embedded into the instruction.

An access server operating in a packet switched telecommunication network such as a VoIP or IMS network, is proposed for distributing an announcement to user equipment. The user equipment may also reside in Circuit switched (CS) network, the call terminating in the packet switched network. The access server acts as media gateway between the IMS (VOIP) domain and the CS domain. The access server comprises a processing unit, a memory for cooperating with the processing unit and a communication unit for communicatively connecting to (i) user equipment, (ii) a media source and (iii) an application server, both in use operating in the packet switched network, and (iv) a caching unit associated with the access server for caching announcements. The communication unit comprising a receiver for receiving an announcement and for receiving a caching indication associated with the announcement to allow caching of the announcement, a transmitter for sending the received announcement to the user equipment. The access server further comprises a Cache Control Function module for caching the received announcement on receipt of said announcement and said caching indication. The access server is arranged to perform any of the steps of the method above relating to an access server. The access server is preferably arranged as an entity in an IMS network.

Further a media source for generating an announcement is proposed, the media source in use operating in a packet switched telecommunication network, such as a VoIP or IMS network. The media source comprises a processing unit, a memory for cooperating with the processing unit and a communication unit for communicatively connecting to a media source controller and an access server, both in use operating in the packet switched telecommunication network. The communication unit comprises a receiver for receiving an instruction to generate an announcement and a transmitter for sending the announcement to the access server. The media source further comprises a caching indication generator for generating a caching indication for allowing the access server to cache an announcement. The transmitter is further arranged for sending the caching indication to the access server. The media source is arranged to perform the steps of the method as set out above. The media source is preferably arranged as an entity in an IMS network.

Still further an application server for controlling an access server in distributing an announcement is proposed, the application server and access server in use operating in a packet switched telecommunication network, such as a VoIP or IMS network. The application server comprises a processing unit, a memory for cooperating with the processing unit and a communication unit for communicatively connecting to a user equipment, a media source controller and an access server.

The communication unit comprises a receiver for receiving a call setup request from a user equipment and for receiving an indication from the access server which announcements are in cache. The application server further comprises an announcement determination unit arranged for determining whether an announcement is to be generated upon receipt of the call setup request and for generating an instruction to generate the announcement. The application server further comprises an instruction generator for instructing the access server to reserve resources for media transfer to and from the user equipment. The application server further comprises a forwarding unit arranged for obtaining an indication of available announcements in cache from the access server and forwarding the indication to the media source controller. The communication unit further comprises a transmitter for sending the instruction to generate an announcement and for sending the indication of at least one announcement being available in the caching unit to the media source controller.

Still further a media source controller for controlling a media source in generating an announcement is proposed, the media source controller and media source in use operating in a packet switched telecommunication network, such as a VoIP or IMS network. The media source controller comprises a processing unit, a memory for cooperating with the processing unit, a communication unit for communicatively connecting to a media source and an access server. The communication unit comprising a receiver for receiving an instruction to generate an announcement and to generate an indication of at least one announcement being available in the caching unit at an access server. The media source controller further comprises a forwarding unit, the forwarding unit arranged for forwarding the instruction for generating an announcement and for generating the indication of at least one announcement being available in the caching unit to the media source. The communication unit further comprises a transmitter for sending the instruction to generate an announcement and the indication of the announcement being available in the caching unit by an access server to the media source.

BRIEF DESCRIPTION OF THE DRAWINGS

The invention will be elucidated by the drawings set out below and appended to this application.

DETAILED DESCRIPTION

Figure 1:
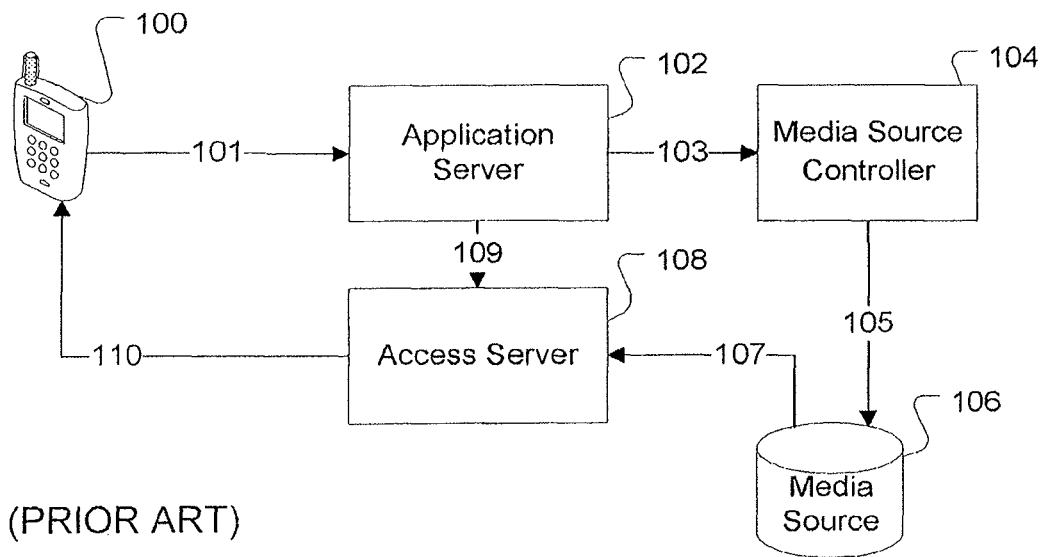
FIG. 1 is a block diagram illustrating generation and distribution of an announcement according to the prior art.

The invention will be further explained with reference to the above mentioned drawings. Like reference numerals have been used for like features in the drawings. In the following description examples are given with respect to an implementation of an IP Multimedia Subsystem (IMS), although the invention can equally be implemented in another type of a packet switched telecommunication network, such as a Voice over IP protocol network applying functional equivalencies of an IMS network. Where in the description not explicitly stated, the term calling party and user equipment both refer to user equipment of the calling party.

FIG. 1 is a block diagram of providing and distributing an announcement in a packet switched telecommunication network according to the state of the art. A user equipment 100, which can be a terminal, mobile phone, wired telephone or any other equipment for setting up a call, sets up a call 101 via a suitable network connection. The user equipment 100 can reside in the same packet switched network as the called subscriber, but can also reside in another network such as a Circuit Switched network or a mobile telecommunication network. The call setup request 101 arrives at an Application Server 102 at the network border. The Application Server 102 can for example, with reference to IMS network entities, be a Proxy Control State Control Function (P-CSCF), an access gateway to the IMS network, a Media Gateway Control Function (MGCF), an Interconnection Border Control Function (IBCF), or any other entity exhibiting User to Network Interface (UNI) or Network to Network Interface (NNI). The Application Server 102 can also represent a combination of one of aforementioned functional entities, a Proxy Control State Control Function (S-CSCF) and a Session Initiation Protocol (SIP) application server. The Application Server 102 determines that an announcement is to be streamed towards user equipment 100 of the served subscriber or calling party.

The Application Server 102 sends to that end a control message to a Media Source Controller 104, which can for example be a Media Resource Function Controller (MRFC). The Media Source Controller 104 sends an instruction 105 to a Media Source 106, which can be a Media Resource Function Point (MRFP) or a Voice mail system or any other content system providing announcements.

The Media Source Controller 104 is the entity that controls the Media Source 106. For example when the Media Source 106 is an MRFP, then the Media Source Controller 104 is an MRFC. The Media Source 106 provides a prerecorded announcement 107 in the form of an announcement media stream to an Access Server 108 associated with the Application Server 102.

The Access Server 108 can be an IMS access gateway, an IMS-Media GateWay (MGW) or a Transition Gateway (TrGW), which can be associated with a P-CSCF, an MGCF and an IBCF respectively.

The Application Server 102 incorporates an Access Server Control Function in order to control the associated Access Server 108. The combination of Application Server 102 and Access Server 108 is also known as Access Session Border Gateway (A-SBG). The Access Server 108 distributes after receipt of the announcement 107 from the Media Source 106 the announcement 110 to user equipment 100 of the calling subscriber.

The Application Server 102, Media Source Controller 104, Media Source 106 and Access Server 108 utilize specific protocols for communication. In an IMS network, signalling is for example performed using SIP signalling, whereas media streaming is performed using Real-time Transport Protocol (RTP) and Real-time Transport Control Protocol (RTCP). Streaming an announcement 107 entails that an RTP media stream and an RTCP data stream are established towards from the Media Source 104 to the Access Server 108 and from the Access Server 108 to the calling party user equipment 100 respectively.

The RTP data stream, carrying media such as voice or video, and the RTCP data stream, carrying messages that govern the quality of the RTP transmission, are established based on addressing information exchanged through SIP, provided 109 by Application Server to 102 to the Access Server 108.

Figure 2:
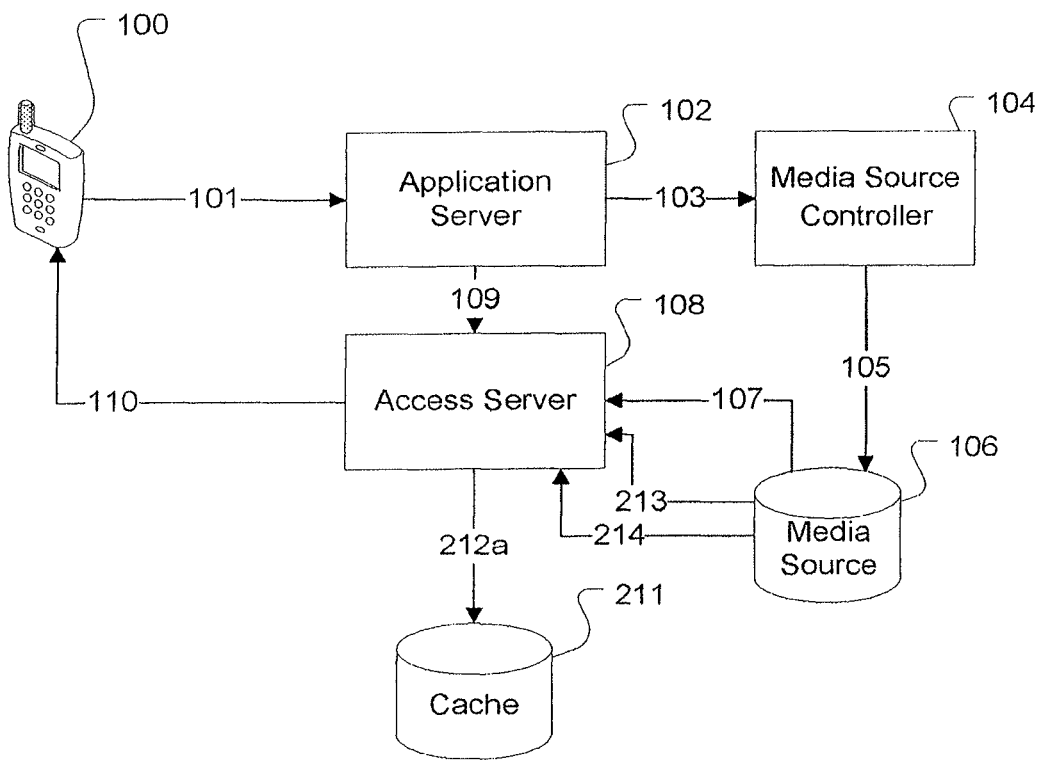
FIG. 2 is a block diagram of generation, caching and sending an announcement according to an embodiment of a network.

FIG. 2 is a block diagram of distributing announcements to a calling subscriber according to an embodiment of the invention.

As in FIG. 1, user equipment 100 of the calling subscriber sets up a call 101 which is handled by Application Server 102. The Application Server 102 determines that an announcement is to be sent to the calling subscriber user equipment 100. This may for example be an announcement that the line to the called subscriber is busy.

The Application Server 102 sends an instruction 103 to provide an announcement indication to the Media Source Controller 104 which in turn instructs 105 the Media Source 106 to play the announcement towards user equipment 100. The instruction can comprise an announcement identifier. The Media Source 106 then sends the announcement 107, preferably in an announcement media stream to the Access Server 108. The Media Source 106 indicates by means of a caching indication 213, when starting the streaming of the announcement, that this announcement should be cached by the Access Server 108. This way the Media Source 106 is in control of caching the announcement, where the Access Server 108 performs the actual caching of the announcement.

When the announcement media stream arrives at the Access Server 108, the announcement 107 is sent in another media stream 110 to the user equipment 100. When the caching indication 213 and the announcement 107 have arrived at the Access Server 108, and while the announcement is being streamed 110 towards the user equipment 100, the Access Server 108 caches 212a the announcement in a caching unit, further referred to as Cache 211, associated with the Access Server 108. Caching 212a is performed by sending the announcement 107 and/or the announcement media stream in whole or in part to the Cache 211, where it is stored.

Various timing arrangements of the announcement and the caching indication arriving at the Access Server 108 and the caching 212a of the announcement can apply. The announcement can alternatively be cached 212a after streaming 110 to the user equipment 100. The caching indication 213 can also arrive at the Access Server 108 prior or after the arrival of the announcement.

The announcement media stream comprises the announcement 107 and can further comprise a header and trailer, indicating properties of the announcement such as start, stop, length, of the announcement media stream, codec type, etc. The announcement media stream can comprise the caching indication 213, for example in the header.

A unique announcement identifier 214 representing a specific announcement is provided. The announcement identifier 214 can also be comprised in the caching indication 213 or in announcement media stream. This announcement identifier 214 is maintained in the telecommunication network such that each announcement cached by the access server 108 corresponds to such an announcement identifier 214.

In an IMS network, the Media Source 106 streams the announcement 107 in said announcement media stream to the Access server 108, and inserts the caching indication 213 that the announcement can be cached by the Access Server 108, and where applicable the announcement identifier 214, in a first RTP packet related to the announcement media stream. The last RTP packet of the announcement media stream can contain an indication that the announcement media stream is complete. Hence, when the last RTP packet of to the announcement media stream traverses the Access Server 108, the Access Server 108 determines that the announcement media stream is complete.

The RTP data stream has a designated RTCP data stream associated with it. The caching indication 213 provided by the Media Source 106 representing an indication that the streamed announcement should be cached, can also be included in the first RTCP message of this RTCP data stream instead of in the first RTP message of the RTP data stream.

Announcements to be cached associated with a particular Access Server 108 need not pertain to a single particular Media Source 106, but could have been received from various media sources 106 such as MRFPs, voice mail boxes and media servers as described.

When an announcement is cached 212a in Cache 211, the announcement data are obtained from the RTP media stream 107. The actual data to be cached can be confined to the PCM encoded speech information that is carried in the RTP messages, as well as information such as an identification of the contributing Media Source 106. Announcements are preferably cached 212a for a particular codec type, for example G.711 being generally used for voice calls to prevent the need for transcoding at Access Server 108. Information related to the RTP message transmission such as message number does not need to be cached. Such information will be regenerated in any announcement that is streamed from Cache 211.

Figure 3:
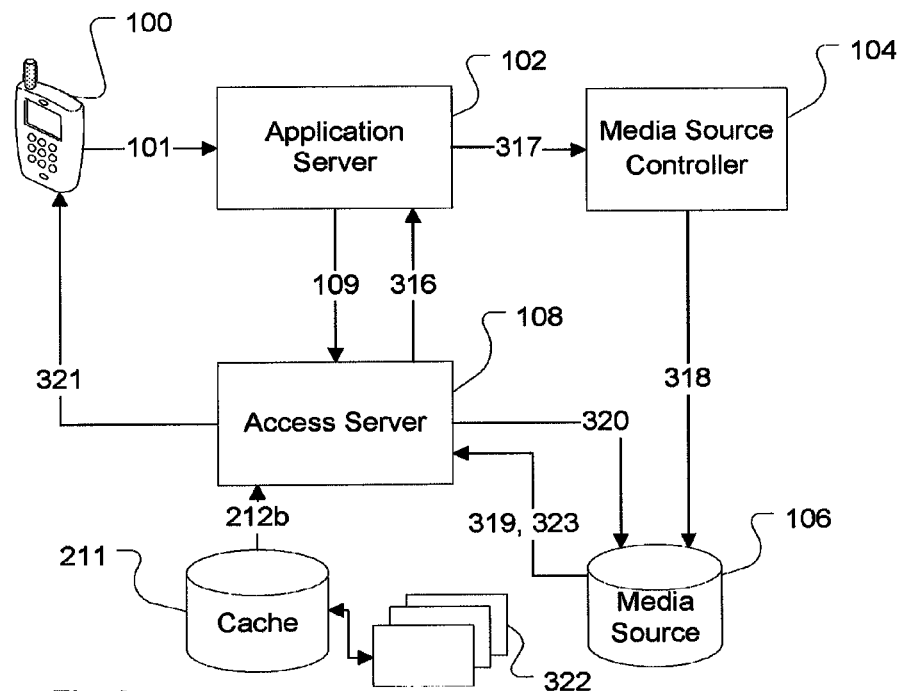
FIG. 3 is a block diagram of retrieving and sending a cached announcement according to a further embodiment of a network.

FIG. 3 shows how an announcement is streamed towards a user equipment 100 after the announcement is retrieved 212b from Cache 211 by the Access Server 108.

When a user equipment 100 within the packet switched telecommunication network, or from outside, for example in a neighbouring CS network, sets up a call to a subscriber within the packet switched network, a call setup request 101 will be sent through the Application Server 102 towards the packet switched core network. The call setup request 101 can contain a Session Description Protocol (SDP) containing a "media offer", according to the state of the art, further referred to as SDP offer.

The Application Server 102 determines that an announcement is to be sent to the calling subscriber user equipment 100.

Media streamed to the subscriber user equipment 100 for this call pertaining to the announcement shall traverse Access Server 108. The Application Server 102 adapts for that purpose the IP address in the SDP offer in the call setup request, to be used by the Media Source 106 for sending the announcement towards User Equipment 100, to that of the Access Server 108. At the same time the Application Server 102 reserves 109 resources, i.e. a media connection to the User equipment 100 in the Access Server 108. The Access Server 108 subsequently sends an indication 316 to the Application Server 102 on the availability of announcements 322 in Cache 211. This indication 316 can be included of a list of unique identifiers of the cached announcements being available in cache as described above. The Application Server 102 forwards the call or session setup request 317 to the Media Source Controller 104. The list of announcement identifiers will be included by the Application Server 102 in the SDP offer for this call setup request. The Media Source Controller 104 sends an instruction 318 to the Media Source 106 to play the announcement, whereby the list of announcement identifiers of announcements being available in cache is sent with the instruction 318.

In terms of an IMS network comprising a P-CSCF as Application Server 102 (optionally in combination with S-CSCF and SIP application server), an IMS-gateway as Access Server 108, an MRFC and MRFP as Media Source Controller 104 and Media Source 106 respectively, the steps performed in FIG. 3 are described as follows:

(1) A SIP Invite 101 arrives at P-CSCF 102, containing an SDP offer.

(2) The IMS-ALG contained in the P-CSCF 102 selects an IMS access gateway 108 and reserves 109 resources in this IMS access gateway 108. The IMS gateway 108 reports 316 the cached announcements to P-CSCF 102.

(3) the SDP offer in the SIP Invite 317 that is sent further into the IMS network contains the list of announcements available in Cache 211.

(4) The IMS-ALG contained in the P-CSCF 102 determines that an announcement needs to be streamed, so a SIP Invite 317 is sent to MRFC 104. This SIP Invite contains the SDP offer that is received from the subscriber user equipment 100, wherein the list of cached announcements is included by the P-CSCF 102.

(5) MRFC 104 provides the SDP offer including the list of cached announcements in an H.248 Add Message to the MRFP 106, selected for this call. Now MRFP 106 has an indication of the available announcements in cache at the IMS access gateway 108 for streaming a particular announcement.

The list of cached announcements will not be retained in the SDP offer when it is sent across a network boundary. For example when the SIP Invite crosses a P-CSCF towards an end user or traverses an Interconnection Border Control Function (IBCF), the list will be removed from the SDP.

It is emphasized that sending the SDP offer in step (3) is standard methodology according to the state of the art. However the SDP offer includes a list of cached announcements. This does not affect the regular SIP signalling and SDP offer/answer. Existing SIP messages and existing SDP exchanges, having the above-described enhancement to the SDP offer for including the indication of announcements in cache, are used to signal in the forward direction that certain cached announcements are available.

The Media Source 106 now receives the instruction 318 from the Media Source Controller 104 to stream the announcement towards the calling party User Equipment 100, i.e. towards the Access Server 108, i.e. the IP address included in the SDP offer, together with the list of cached announcements which contains the unique identifier associated with the announcement that the Media Source 106 has to stream towards the calling party User Equipment 100. If the announcement identifier is in the list, then the announcement can be streamed from the Access Server 108 instead of from the Media Source 106.

The Media Source 106 sends an instruction 319 in the form of an RTP message towards the Access Server 108 indicated by the IP address in the SDP offer, to retrieve 212*b* the cached announcement 322 from cache 211 and to stream 321 the respective cached announcement 322 to the calling party User Equipment 100. The RTP message contains the announcement identifier 323 associated with the announcement to be retrieved form cache by the Access server 108. The announcement identifier 323 can also be embedded in the instruction 319. When the Media Source 106 is instructed by the Media Source Controller 104 to stop streaming the announcement, the Media Source 106 sends an RTP message towards the Access Server 108 indicating that the streaming of the announcement shall be stopped.

When the Access Server 108 has streamed an entire announcement it sends an RTP message towards the Media Source 106 indicating that the announcement is complete. The Media Source 106 notifies the Media Source Controller 104 which can give further instructions as normal. The instructions to start or stop streaming an announcement, as well as the indication from the Access Server that the streaming of the announcement is completed can be carried in an RTP header, however this can also be carried in an RTCP message.

The Access Server 108 can have cached announcements 322 from a number of media sources 106 and can be streaming 321 these announcements to a large number of subscribers as indicated in FIG. 3. A single 24 kb/s data stream (or other data density depending on the media to be streamed) from a media source to the Access Server 108 is replaced in the packet switched telecommunication network, i.e. the IMS core network, by a single Start Message and a single Stop Message per announcement.

An alternative method for a Media Source 106 to be made aware of available announcements in an Access Server 108 cached 211 is described as follows.

When the Media Source 106 receives an instruction 318 from the Media Source Controller 104 to stream an announcement to a particular remote IP address and port number, belonging to Access Server 108, it can send a first RTCP message to said remote IP address and port number, requesting the remote entity, the Access Server 108, to report back whether the required announcement is available in the caching unit 211. For example Media Source 106 is requested by Media Source Controller 104 to stream announcement with unique Id#34.

Media Source 106 sends an RTCP message to the Access Server 108 requesting whether the announcement associated with Id#34 is in Cache 211. Access Server 108 sends an RTCP message in response containing an indication that the requested announcement with the Id#34 is available in Cache 211. If the RTCP response message from the Access Server 108 indicates that the announcement is available in Cache 211, then the Media Source 106 sends an RTCP message 319 instructing the Access Server 108 to start streaming that particular message. Otherwise, Media Source 106 will apply announcement streaming 107 as normal as shown in FIG. 2. In other words, the announcement will be streamed 107 to the Access Server 108 and an indication 213 that the announcement 107 can be cached in Cache 211 is sent to the Access Server 108, etc.

For this method, whereby the availability of cached announcements is reported through the user plane, there is no requirement to include a list of cached announcements in the SDP of the instruction 318 from the Media Source Controller 104. Also in this case data stream requiring core network resources for streaming an announcement is replaced by sending start and stop messages per announcement.

Various other alternative solutions are available for informing the Media Source 106 of announcements being available in cache. For example, when the Media Source 106 sends an indication 213 that an announcement 107 may be cached, the Media Source 106 can maintain a list of cached announcements. Furthermore, the Access Server 108 may provide the Media Source 106 with a list of announcements being available in cache on a regular basis.

Maintenance of cached announcements 322 is described below.

As described, when a particular announcement 107 traverses a particular Access Server 108 for the first time, it can be cached 212*a* in Cache 211 if so indicated 213 in the first RTP or RTCP message from the Media Source 106. This indication 213 can also contain a Time-To-Live (TTL) value. When the TTL time expires, the cached announcement 322 can be purged from the Cache 211. Next time a media connection is established through this Access Server, the announcement will no longer be in the list of cached announcements. If that announcement must however be streamed towards the calling party it has to be streamed by the Media Source 106 and can be cached 212*a* again as described above. The maintenance of announcements available in the caching unit 322 can be a function of the Access Server 108 or of the Cache 211 itself.

Each time a Media Source 106 indicates 213 to an Access Server 108 to cache an announcement 107 at the Cache 211, the "start streaming" instruction contained in the RTP or RTCP message from the Media Source 106 can include a TTL-reset value. A validity counter associated with the TTL value of the announcement can then be reset to its original value as when the announcement was cached 212*a* in Cache 211. When a particular announcement is removed from the Media Source 106, the announcement will not be streamed anymore and will hence expire at some moment in time in the Cache 211 where it was cached. Various alternative schemes for maintaining and/or purging announcements in Cache 211 may apply.

The list of cached announcements will in practice be finite. Depending on the implementation the Access Server 108 could have a Cache 211 with a capacity to store up to 25 announcements. When an announcement is streamed through the Access Server 108, and the announcement 107 contains an indication 213 that it can be cached, then the Access Server 108 can purge a currently cached announcement 322 in favour of the new announcement.

The Access Server 108 can apply alternative rules for determining which announcements to maintain in cache 322 and which announcements to purge, for example:
- announcements can be purged that have the longest time of non-use among the cached announcements;
- announcements can have a priority value associated with them by media source, by occurrence frequency, or other criteria, announcements with long duration can lead to more bandwidth saving, so such announcement can be associated with high priority.

Furthermore an announcement version indication can be provided associated with an announcement in order to facilitate updating of the announcements in cache. The version indication can be included in the indication of at least one announcement being available in the caching unit sent by the Access Sever 108 and forwarded to the Media Source 106. The Media Source can check the version indication of the announcements in cache 322 with its own announcements. When a new version of an announcement is in the Media Source it can stream the announcement anyway accompanied by a caching indication to the Access Server, for the Access Server to update its announcements in cache 322 with the updated announcement.

Figure 4:
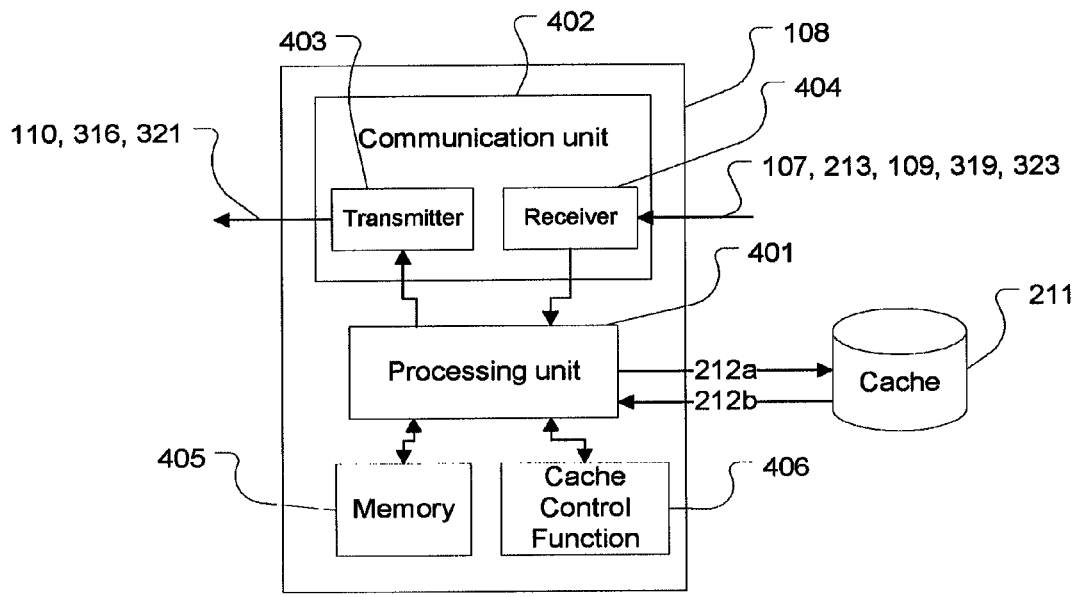
FIG. 4 is a block diagram of an access server according to an embodiment of a network.

FIG. 4 is a block diagram of an Access Server 108. The Access Server 108 represents an entity at the border of a packet switched telecommunication network, i.e. an IMS network, through which the media pertaining to the announcements will be flowing out of the network. Announcements streamed 110, 321 towards a subscriber 100 can be cached 212a in a Cache 211 associated with this entity. The announcements can be streamed 321 from cache 211 to such subscriber 100 under instruction 319 of a Media Source 106.

The Access Server 108 comprises a processing unit 401 and communication unit 402, where the communication unit 402 comprises a transmitter 403 and a receiver for communicating with other entities in the packet switched telecommunication network, more in particular an IMS network. The communication unit 402 is adapted to be connectable to various telecommunication networks using various telecommunication protocols known in the art, as are the respective transmitter 403 and receiver 404. The processing unit 401 which is connected to the transmitter 403 and receiver 404 utilizes a memory 405. The processing unit 401 further cooperates with a Cache Control Function 406.

The memory 405 is arranged to have a set of instructions which are executable by the processing unit 401.

The receiver 404 is arranged to receive announcement 107 and caching indication 213 as described above. The processing unit 401 submits the announcement 107 and caching indication 213 to Cache Control Function 406. The Cache Control Function 406 caches 212a the announcement 107 in cache 211. Furthermore the processing unit forwards 110 the announcement via transmitter 403 to user equipment 100 as described above.

The Cache 211 can be a part of the memory 405 (not shown), such that the Cache 211 is incorporated into the Access Server 108. The Cache 211 can also be a separate memory as shown in FIGS. 2-4, having a communicating interface for communicating with the Access Server 10. The Cache 211 can also be incorporated with another network node in the network in close proximity to the Access Server, to prevent extensive use of network resources to store and retrieve 212b announcements to and from Cache 211.

The Access Server 108 can further be equipped with a indication generation function for generating an indication 316, 320 that at least one announcement is available in the caching unit 211, which indication can be communicated 317, 318 to a Media Source 106. The indication 316, 320 can be included in a list of cached announcements being available in Cache. The Cache Control Function 406 and the indication generation function can be performed in software, executed by the processing unit 401, or in a dedicated hardware module.

The receiver 404 is further arranged for receiving a request 109 to reserve resources for media transfer to and from a calling party from an application server 102. The processing unit 401 submits this request to the Cache Control Function 406. The Cache Control Function 406 checks in response to request 109 the cache 211 and creates a list of announcements being available in cache. The list can consist of a list of identifiers indicating the cached announcements (see FIG. 3, 322). The processing unit 401 submits the list of announcements available in cache to the transmitter 403 which transmits 316 the list to the Application Server 102.

The receiver 404 is further arranged to receive an instruction 319 for the Access Server 108 to stream 321 a cached announcement to user equipment 100. The instruction is submitted by the processing unit 401 to the Cache Control Function 406, which retrieves 212b the announcement from cache 211. The processing unit 401 then submits the announcement to the transmitter 403 which streams the announcement 321 to the user equipment 100. The instruction to stream an announcement from cache 319 can comprise or can be accompanied by an announcement identifier 323 associated with the announcement to be streamed.

The receiver 404 can further be arranged to receive a request from the media source to provide a list of announcements being available in cache. The processing unit 401 submits this request to the cache control function 406 which checks the cache 211 and provides a list to the processing unit 401, which submits the list to transmitter 403 and send it to the media source 106.

Figure 5:
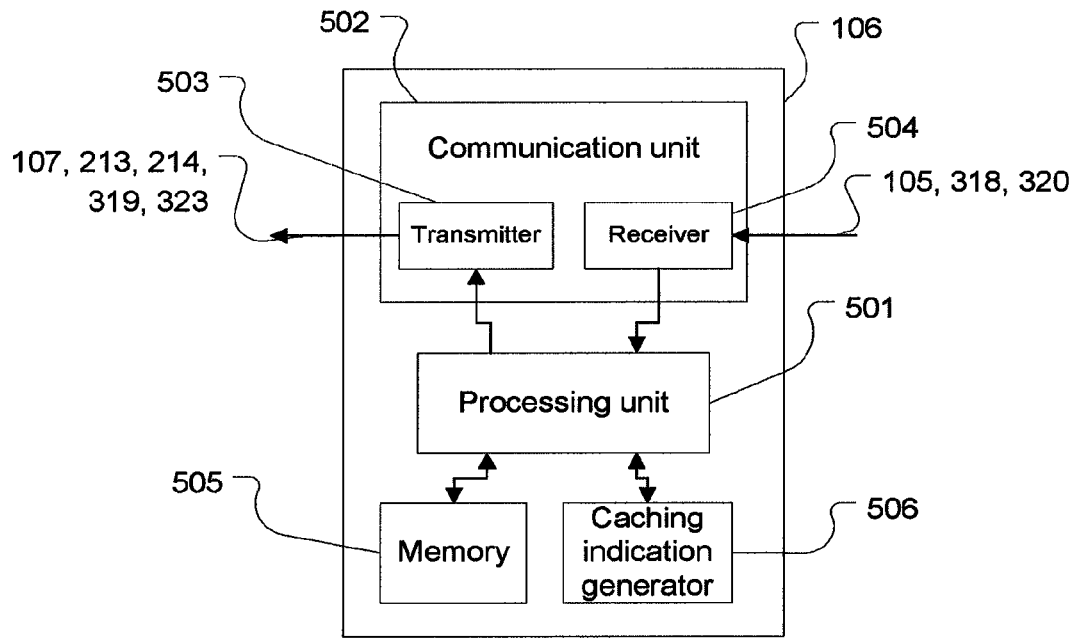
FIG. 5 is a block diagram of a media source according to an embodiment of a network.

FIG. 5 shows a block diagram of a Media Source 106. The Media Source 106 constitutes the entity from which an announcement 107 is streamed. When the Media Source 106 has received an instruction to stream a particular announcement and the Media Source 106 has received an indication 318 that the Access Server 108 at the border of the packet switched telecommunication network has the required announcement in Cache 211, then the Media Source 106 will instruct the Access Server 108 to retrieve 212b and stream 321 the announcement from the Cache 211 instead of forwarding 110 the announcement media stream 107 to the Access Server 108. The Media Source 106 can for example be an MRFP or voice mail system.

The Media Source 106 comprises a processing unit 501 and a communication unit 502, where the communication unit 502 comprises a transmitter 503 and a receiver 504 for communicating with other entities in the packet switched telecommunication network, more in particular an IMS network. The communication unit 502 is adapted to be connectable to various telecommunication networks using various telecommunication protocols known in the art, as are the respective transmitter 503 and receiver 504. The receiver 504 is adapted to receive an instruction 105, 319 from a Media Source Controller 104 to provide an announcement.

The processing unit 501 processes such an instruction and is adapted to stream the announcement 107 via the transmitter. The processing unit 501 cooperates with a caching indication generator 506 for generating a cache indication 213 together with the announcement media stream 107. The processing unit 501 in general cooperates with a memory 505 holding program instruction which in use allow the processing unit 501 to perform the steps of the method and functions as described in this paragraph. The Media Source 106 can be equipped with a caching indication request generator (not shown in FIG. 5) for requesting an Access Server 108 for providing a list of cached announcements or for providing a caching indication of a particular announcement. The Media Source 106 can also be equipped with a streaming instruction generator (not shown), for generating an instruction 319 to be sent by the transmitter to an Access Server 108 to stream a cached announcement 322. When the instruction to generate an announcement is received, the processing unit 501 can check whether or not the instruction is available in cache from the list of announcements available in cache, included in the instruction 105, 319. Alternatively, the processing unit can maintain a list of announcements in memory 505 with an associated status indicator indicating whether or not an instruction has been generated to cache the announcement by an Access server 108. The processing unit 501 can also receive an alternative indication of announcements available in cache 520 from the Access Server 108 directly. This indication 320 can be a reply from the Access Server 108 to a request for the indication (not shown) sent by the processing unit 501 using the transmitter 503 to the Access Server 108.

If the announcement is available in cache, the streaming instruction generator will be triggered to generate the instruction 319 for the Access Server 108 to stream the cached announcement to the Access server 108, which instruction is sent to the Access Server using transmitter 503. If the announcement is not available in cache, the Caching Indication Generator 506 is triggered to generate the caching indication 213, which is sent to the Access Server 108 using transmitter 503. In the latter case, also the announcement is sent 107 to the Access Server 108 using transmitter 503 using protocols as described above.

Figure 6:
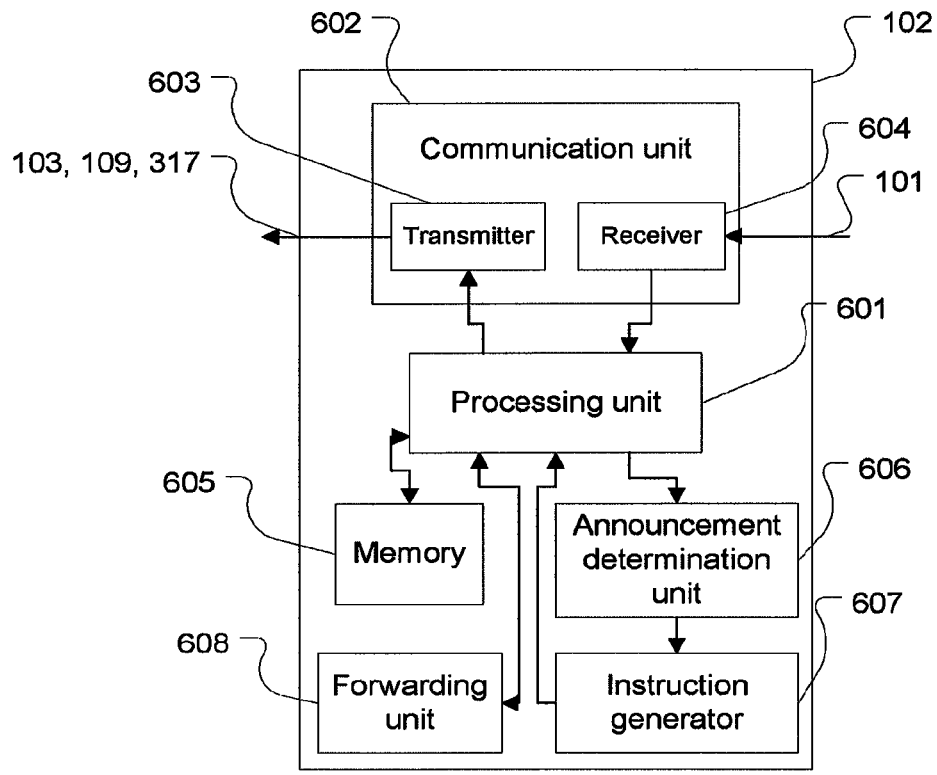
FIG. 6 is a block diagram of an application server according to an embodiment of a network.

FIG. 6 is a block diagram of an Application Server 102. The Application Server 102 is the entity that controls the Access Server 108, which can be an IMS-ALG associated with a P-CSCF. The Application Server 102 can be adapted to perform announcements cache reporting through SDP, as described above. The Application Server 102 comprises a processing unit 601 and a communication unit 602 comprising a transmitter 603 and a receiver 604 for communicating with other entities in the packet switched telecommunication network, more in particular an IMS network. The communication unit 602 is adapted to be connectable to various telecommunication networks using various telecommunication protocols known in the art, as are the respective transmitter 603 and receiver 604. The receiver is adapted for receiving a call setup request 101, the transmitter 603 is equipped for transmitting an instruction 109 for reserving resources to an Access Server 108 and a request 103, 317 to stream an announcement to a Media Source Controller 104.

The processing unit 601 cooperates with a memory 605 having instructions allowing the processing unit 601 to perform the functions described in this paragraph. Furthermore the processing unit 601 cooperates with an announcement determination unit 606 for determining an announcement to be streamed towards a subscriber 100 based on the received call setup request 101. An instruction generator 607 generates the request 103, 317 to stream the announcement based on the determined announcement. The processing unit 601 further cooperates with a forwarding unit 608, adapted to forward the list from the Access Server of cached announcements.

When a call setup request 101 arrives via receiver 604 at the Application Server 102, the Announcement determination unit 606 determines whether an announcement is to be streamed towards the user equipment 100 by the announcement determination unit 606. The processing unit 601 requests 109 the Access Server 108 to reserve resources for media transfer to and from user equipment 100 using transmitter 603, i.e. a media connection, for streaming the announcement to the User Equipment 100 and to generate an address, e.g. an IP address, to which the announcement, and where applicable other real-time media destined for the calling party user equipment, is to be streamed. The processing unit 601 receives via receiver 604 an indication 316 of at least one announcement being available in the caching unit 211, for example a list of cached announcements, from the Access Server 108 in response to reserving resources at the Access Server 108. The processing unit 601 in turn includes the indication 317 of available announcements in cache in the SDP offer included in request, SIP invite 103, to generate an announcement and forwards it using forwarding unit 608 to Media Source Controller 104 using transmitter 603.

Figure 7:
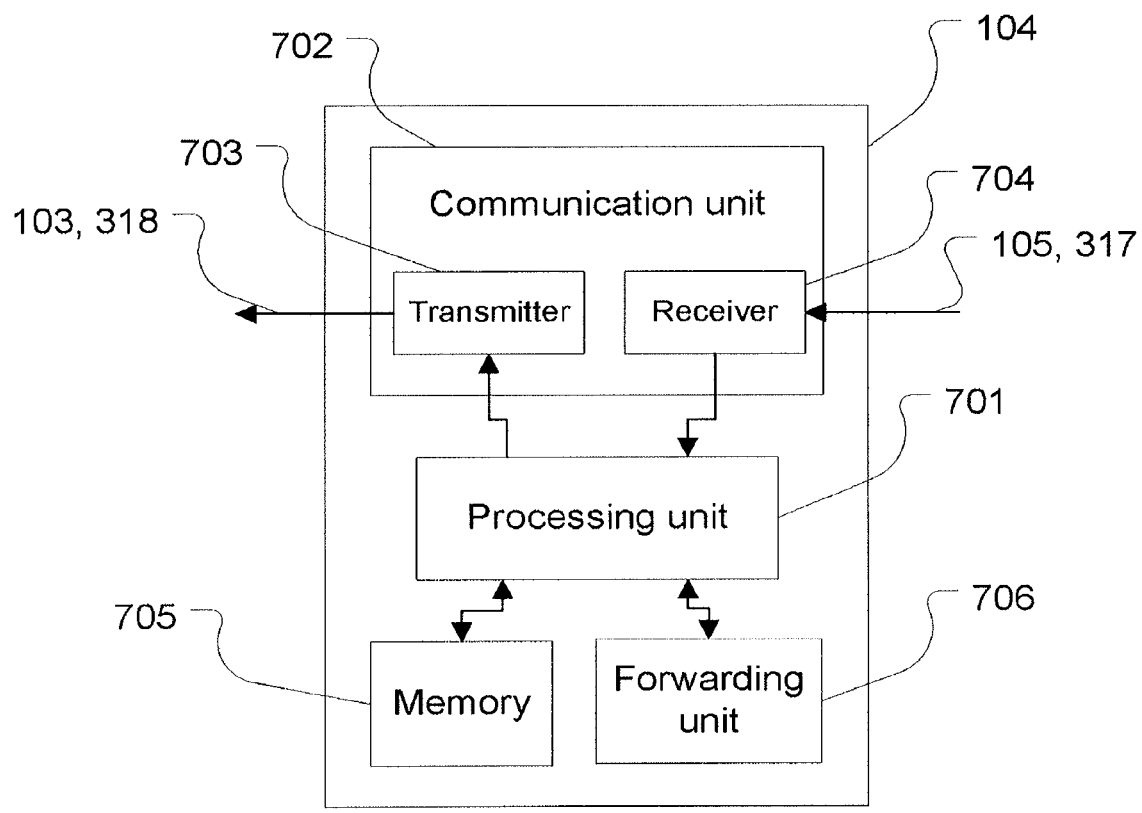
FIG. 7 is a block diagram of a media source controller according to an embodiment of a network.

FIG. 7 is a block diagram of a Media Source Controller 104. The Media Source Controller 104 can be adapted to receive an SDP offer in request 317 containing a list of cached announcements in an instruction to stream a particular announcement. Ideally the Media Source Controller 104 forwards 318 the SDP offer to the Media Source 106. When the Media Source 106 is then instructed to stream a certain announcement 107 towards the calling party 100, it can use the list of cached announcements cached in the Access Server Cache 211 to determine whether to stream the announcement or to make use of the Cache 211 of the Access Server 108.

The Media Source Controller 104 comprises a processing unit 701 and a and a communication unit 702 comprising a transmitter 703 and a receiver 704 for communicating with other entities in the packet switched telecommunication network, more in particular an IMS network. The communication unit 702 is adapted to be connectable to various telecommunication networks using various telecommunication protocols known in the art, as are the respective transmitter 703 and receiver 704. The receiver 704 is adapted for receiving an SDP offer from the Application Server 102 related to an instruction for streaming an announcement. Optionally the SDP offer contains a list of cached announcements sent by an Access Server 108 associated with the Application Server 102, which indication can be incorporated into a list of cached announcements. The transmitter 704 is equipped for transmitting a command to a media Source 106 to stream an announcement to an Access Server 108.

The processing unit 701 cooperates with a memory 705 having instructions allowing the processing unit 601 to perform the functions described in this paragraph. Furthermore the processing unit 701 cooperates with a forwarding unit 706, adapted for forwarding a received instruction 317 from the Application Server 106 to a Media Source 106. Optionally the instruction 318 contains the indication of the announcement being available in cache, the announcement can contain a list of cached announcements.

The fast connection of the Cache 211 and the Access server 108 provides an additional advantage that the announcement to be streamed 321 from Cache 211 to the user equipment 100 is available faster than according to the state of the art. Another advantage is that due to the shorter path of the cached announcement to the Access Server the error rate can be low, so that an announcement streamed from Cache has a fast response time and be streamed interruption free.

A further advantage is that the requested announcement does not have to be specially designed or modified to be cached, it is either cached or just forwarded to the requesting user equipment 100.

The request for the announcement media has not to be diverted to another media source for receiving the cached announcement from the Media gateway. The subsequent streaming-from-cache of a cached announcement is done in-line with the regular media streaming path between said content server 106 (containing the announcements) and the client. The Media gateway is located in that path. Traversal of the media session through that Media gateway is governed by standard call signaling, including ISUP and SIP, and is not dependent on diversion of the request for an announcement.

The above described embodiments are given by way of example only. These embodiments can be changed or modified or altered in any way without departing from the scope of the invention as laid down in the following claims. For example, alternative formats of transporting the announcement 107 from the Media Source 104 to the Access Server 108 such as transmission of media content files can be considered and such formats do not limit the scope of the invention.

ABBREVIATIONS

A-SBG Access Session Border Gateway
IBCF Interconnection Border Control Function
IMS IP Multimedia Subsystem
IMS-ALG IMS Application Level Gateway
IMS-MGW IMS Media Gateway
IP Internet Protocol
MGCF Media Gateway Control Function
MRFC Media Resource Function Controller
MRFP Media Resource Function Point
NNI Network to Network Interface
PCM Pulse Code Modulation
P-CSCF Proxy Call Session Control Function
RTP Real-time Transport Protocol
RTCP Real-time Transport Control Protocol
SDP Session Description Protocol
SIP Session Initiation Protocol
SIP-AS Session Initiation Protocol Application Server
S-SBG Signaling path Session Border Gateway
TrGw Transition Gateway
TTL Time To Live
UNI User to Network Interface
VoIP Voice over Internet Protocol

REFERENCE NUMERALS

100 user equipment of calling party
101 call setup request
102 Application Server handling call setup request
103 request to send an announcement
104 Media Source controller
105 instruction to send an announcement
106 Media Source
107 announcement sent by Media Source
108 Access Server
109 request to reserve resources for media transfer to and from the calling party user equipment
110 announcement sent by Access Server
211 Cache
212*a* caching an announcement in Cache
212*b* retrieving an announcement from Cache
213 caching indication
214 announcement identifier for caching an announcement
316 indication of announcements in cache from Access Server
317 call or session setup request having an instruction to stream an announcement and an indication of announcements being available in Cache
318 instruction to stream an announcement with indication of announcements being available in Cache
319 instruction to stream a cached announcement
320 alternative indication of announcements available in cache from Access Server
321 streaming an announcement from Cache
322 cached announcements
323 announcement identifier for retrieving an announcement from Cache
401 Access Server processing unit
402 Access Server communication unit
403 Access Server transmitter
404 Access Server receiver
405 Access Server memory
406 Access Server Cache Control Function
501 Media Source processing unit
502 Media Source communication unit
503 Media Source transmitter
504 Media Source receiver
505 Media Source memory
506 Media Source caching indication generator
601 Application Server processing unit
602 Application Server communication unit
603 Application Server transmitter
604 Application Server receiver
605 Application Server memory
606 Application Server announcement determination unit
607 Application Server instruction generator
608 Application Server forwarding unit
701 Media Source Controller processing unit
702 Media Source Controller communication unit
703 Media Source Controller transmitter
704 Media Source Controller receiver
705 Media Source Controller memory
706 Media Source forwarding unit

The invention claimed is:

1. A method of sending an announcement to user equipment, by an access server operating in a packet switched telecommunication network, the method comprising:
    sending, to a media source, a first instruction instructing the media source to provide the announcement;
    receiving the announcement from the media source operating in the packet switched network;
    receiving a caching indication associated with the announcement from the media source, the caching indication instructing the access server to initialize caching of the announcement;
    caching the announcement in a caching unit associated with the access server in response to receiving the caching indication and the announcement;
    sending, to the media source, an indication of the announcement being available in the caching unit;
    sending, to the media source, a second instruction instructing the media source to provide the announcement;
    in response to sending the second instruction instructing the media source to provide the announcement, and based on the indication of the announcement being available in the caching unit, receiving, from the media source, a third instruction instructing the access server to retrieve the announcement from the caching unit, the third instruction comprising an announcement identifier uniquely identifying the cached announcement but not including an associated embedded cached announcement;
    retrieving the cached announcement from the caching unit; and
    sending the retrieved cached announcement towards the user equipment.

2. The method of claim 1, further comprising extracting an announcement identifier associated with the announcement from the caching indication, wherein caching the announcement is performed using the announcement identifier to identify the announcement being cached.

3. The method of claim 1, further comprising:
receiving a request from an application server to reserve resources for media transfer to and from the user equipment; and
sending an indication of the announcement being available in the caching unit to said application server on receipt of said request.

4. The method of claim 3, further comprising:
including the indication in a list of announcements being available in the caching unit; and
sending the list to the application server.

5. The method of claim 1, wherein retrieving the announcement comprises:
extracting an announcement identifier from the third instruction to retrieve the announcement; and
retrieving the announcement from the caching unit corresponding to the announcement identifier.

6. An access server for distributing an announcement to user equipment operating in a packet switched telecommunication network, the access server comprising:
processing unit;
a memory for cooperating with the processing unit, the memory storing a set of instructions which are executable by the processing unit to cause the processing unit to:
send, to a media source, a first instruction instructing the media source to provide the announcement;
receive the announcement from the media source operating in the packet switched network;
receive a caching indication associated with the announcement from said media source, the caching indication instructing the access server to initialize caching of the announcement;
cache the announcement in a caching unit associated with the access server in response to the caching indication and the announcement from the access server;
send, to the media source, an indication of the announcement being available in the caching unit;
send, to the media source, a second instruction instructing the media source to provide the announcement;
in response to sending the second instruction instructing the media source to provide the announcement, and based on the indication of the announcement being available in the caching unit, receive, from the media source, a third instruction instructing the access server to retrieve the announcement from the caching unit, the third instruction comprising an announcement identifier uniquely identifying the cached announcement but not including an associated embedded cached announcement;
retrieve the cached announcement from the caching unit; and
send the retrieved cached announcement towards the user equipment.

7. The access server of claim 6, wherein the access server is an entity in an IP Multimedia Subsystem (IMS) network.

8. The access server of claim 6, wherein the processing unit is further operable to execute the set of instructions to extract an announcement identifier associated with the received announcement from the caching indication, wherein caching the announcement is performed using the announcement identifier to identify the announcement being cached.

9. The access server of claim 6, wherein the processing unit is further operable to execute the set of instructions to:
receive a request from an application server to reserve resources for media transfer to and from the user equipment; and
send an indication of the announcement being available in the caching unit to the application server on receipt of said request.

10. The access server of claim 9, wherein the processing unit is further operable to execute the set of instructions to:
include the indication in a list of announcements being available in the caching unit; and
send the list to the application server.

11. The access server of claim 6, wherein the processing unit is further operable when retrieving the cached announcement from the caching unit to execute the set of instructions to:
extract an announcement identifier from the instruction to send the announcement; and
retrieve, from the caching unit, the announcement corresponding to the announcement identifier.

12. A method of sending an announcement to user equipment, by an access server, the access server in use operating in a packet switched telecommunication network, the method comprising:
caching a plurality of announcements in a caching unit associated with the access server, each of the plurality announcements being associated with a unique identifier;
determining that an announcement should be transmitted to a user equipment;
in response to determining that the announcement should be transmitted to the user equipment, sending, to a media source, a first instruction to provide the announcement, the first instruction including a list of each unique identifier associated with a respective one of the plurality of announcements cached in the caching unit associated with the access server;
in response to sending the first instruction instructing the media source to provide the announcement, and based on the list, receiving, from the media source, a response identifying a particular announcement identifier that uniquely identifies a particular one of the plurality of announcements cached in the caching unit associated with the access server, the response not including the particular one of the plurality of announcements associated with the particular announcement identifier:
in response to receiving the particular announcement identifier from the media source, retrieving the particular one of the plurality of cached announcements that is associated with the announcement identifier from the caching unit; and
sending the particular one of the cached announcements towards the user equipment.

13. The method of claim 12, further comprising:
prior to caching the plurality of announcements in the caching unit, receiving the particular one of the cached announcements and a caching indication, wherein the caching indication is from the media source and instructs the access server to cache the particular one of the cached announcements.

14. The method of claim 12, further comprising:
receiving a request from an application server to reserve resources for media transfer to and from the user equipment; and
sending an indication of the particular one of the cached announcements to the application server on receipt of said request.

15. The method of claim 14, further comprising:
sending the list to the application server.

16. The method of claim 12, wherein retrieving the particular one of cached announcements comprises:
extracting an announcement identifier from the response identifying the particular announcement identifier; and
retrieving the particular one of the plurality of cached announcements from the caching unit corresponding to the announcement identifier.

17. An access server for distributing an announcement to user equipment operating in a packet switched telecommunication network, the access server comprising:
processing unit;
a memory for cooperating with the processing unit, the memory storing a set of instructions which are executable by the processing unit to cause the processing unit to:
cache a plurality of announcements in a caching unit associated with the access server, each of the plurality announcements being associated with a unique identifier;
determine that an announcement should be transmitted to a user equipment;
in response to determining that the announcement should be transmitted to the user equipment, send, to a media source, a first instruction to provide the announcement, the first instruction including a list of each unique identifier associated with a respective one of the plurality of announcements cached in the caching unit associated with the access server;
in response to sending the first instruction instructing the media source to provide the announcement, and based on the list, receive, from the media source, a response identifying a particular announcement identifier that is associated with uniquely identifies a particular one of the plurality of announcements cached in the caching unit associated with the access server, the response not including the particular one of the plurality of announcements associated with the particular announcement identifier;
in response to receiving the particular announcement identifier from the media source, retrieve the particular one of the plurality of cached announcements that is associated with the announcement identifier from the caching unit; and
send the particular one of the cached announcements towards the user equipment.

18. The access server of claim 17, wherein the processor is further operable to execute the set of instructions to:
prior to caching the plurality of announcements in the caching unit, receive the particular one of the cached announcements and a caching indication, wherein the caching indication is from the media source and instructs the access server to cache the particular one of the cached announcements.

19. The access server of claim 17, wherein the processor is further operable to execute the set of instructions to:
receive a request from an application server to reserve resources for media transfer to and from the user equipment; and
send an indication of the particular one of the cached announcements to the application server on receipt of said request.

20. The access server of claim 19, wherein the processor is further operable to execute the set of instructions to:
send the list to the application server.

21. The access server of claim 17, wherein when retrieving the particular one of cached announcements the access server is further operable to execute the instructions to:
extract an announcement identifier from the response identifying the particular announcement identifier; and
retrieve the particular one of the plurality of cached announcements from the caching unit corresponding to the announcement identifier.

* * * * *